(12) United States Patent
Billger et al.

(10) Patent No.: US 7,520,567 B2
(45) Date of Patent: Apr. 21, 2009

(54) SYSTEMS AND METHODS FOR SEAT REPOSITIONING

(75) Inventors: Steven C. Billger, Celina, OH (US); Michael P. Gallagher, Greenville, OH (US); Kevin A. Gilliland, Coldwater, OH (US); Eric J. Hanson, St. Marys, OH (US); Leroy M. Kluver, Celina, OH (US); Jay G. Pollack, Sidney, OH (US); Steven R. Pulskamp, New Bremen, OH (US); Adam M. Ruppert, Wapakoneta, OH (US); Gary L. Topp, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 422 days.

(21) Appl. No.: 10/948,722

(22) Filed: Sep. 23, 2004

(65) Prior Publication Data
US 2006/0061177 A1  Mar. 23, 2006

(51) Int. Cl.
*A47C 1/00* (2006.01)
*A47C 7/62* (2006.01)
*B60K 26/00* (2006.01)
*B62D 1/02* (2006.01)

(52) U.S. Cl. ............... 297/344.22; 297/344.24; 297/217.3; 180/330; 180/331; 180/334

(58) Field of Classification Search ............. 297/217.3, 297/344.22, 344.23, 344.24, 327, 361.1, 297/344.12, 330; 180/326, 329–331, 333–334
See application file for complete search history.

(56) References Cited
U.S. PATENT DOCUMENTS 629,036 A    7/1899  Koenigkramer
1,242,110 A  10/1917 Koken
1,275,624 A   8/1918 Sopwith
1,361,987 A  12/1920 Hamilton (Continued)

FOREIGN PATENT DOCUMENTS

DE    25 44 812 A1    4/1977

(Continued)

OTHER PUBLICATIONS

Crown Turret Stockpicker, Series TSP SF 4310, Rev. Mar. 2002.

(Continued)

*Primary Examiner*—Milton Nelson, Jr.
(74) *Attorney, Agent, or Firm*—Stevens & Showalter LLP

(57) ABSTRACT

A vehicle seat arrangement is provided for a working vehicle comprising an operator's seat having an adjustable feature. A first control element is arranged such that a first work operative position is defined. A seat adjusting element is further provided for enabling the operator to set the adjustable feature of the operator's seat. The seat adjusting element is positioned relative to the first control element such that the operator may selectively control the adjustable feature of the seat without significantly interrupting the first work operative position or without significantly interrupting a transition from a first task to a second task and/or from a first work operative position to a second work operative position.

28 Claims, 4 Drawing Sheets

U.S. PATENT DOCUMENTS

| | | | |
|---|---|---|---|
| 1,808,659 A | 6/1931 | Hultgren | |
| 2,603,303 A | 7/1952 | Atlung | |
| 2,833,367 A | 5/1958 | Pool | |
| 2,845,990 A | 8/1958 | Hubert | |
| 3,013,837 A | 12/1961 | Pessl | |
| 3,066,979 A | 12/1962 | Pitts | |
| 3,182,605 A | 5/1965 | Brasher | |
| 3,195,913 A | 7/1965 | Hallsworth | |
| 3,223,193 A | 12/1965 | Reynolds | |
| 3,254,900 A | 6/1966 | Allen | |
| 3,300,172 A | 1/1967 | Noller | |
| 3,412,968 A | 11/1968 | Rose | |
| 3,437,373 A | 4/1969 | Boston | |
| 3,515,432 A | 6/1970 | Sporman | |
| 3,659,895 A | 5/1972 | Dresden | |
| 3,690,697 A | 9/1972 | Bohanski | |
| 3,693,744 A | 9/1972 | Horn | |
| 3,727,873 A | 4/1973 | Hill | |
| 3,747,723 A | 7/1973 | Peterson | |
| 3,893,728 A | 7/1975 | Holopainen | |
| 3,926,396 A | 12/1975 | Hall | |
| 3,933,224 A | 1/1976 | Nilsson | |
| 4,005,845 A | 2/1977 | Luppi | |
| 4,008,500 A | 2/1977 | Hall, Jr. | |
| 4,097,016 A | 6/1978 | Petrucci | |
| 4,123,028 A | 10/1978 | Quakenbush | |
| 4,134,617 A | 1/1979 | Matsubara | |
| 4,227,670 A | 10/1980 | Vander Burgh | |
| 4,274,503 A | 6/1981 | Mackintosh | |
| 4,278,144 A | 7/1981 | Perin | |
| 4,291,916 A | 9/1981 | Chardon | |
| 4,323,829 A * | 4/1982 | Witney et al. | 318/55 |
| 4,351,562 A | 9/1982 | Twitchell | |
| 4,390,076 A * | 6/1983 | Wier et al. | 180/11 |
| 4,450,927 A | 5/1984 | Hirata | |
| 4,480,867 A | 11/1984 | Ezell | |
| 4,487,445 A | 12/1984 | Johnston | |
| 4,518,139 A | 5/1985 | Barfell | |
| 4,552,250 A | 11/1985 | Luebrecht | |
| 4,570,997 A | 2/1986 | Tanizaki | |
| 4,600,239 A | 7/1986 | Gerstein | |
| 4,671,572 A | 6/1987 | Young | |
| 4,705,256 A | 11/1987 | Hofrichter | |
| 4,730,691 A | 3/1988 | Grigg | |
| 4,733,903 A | 3/1988 | Bailey | |
| 4,802,706 A | 2/1989 | Onimaru et al. | |
| 4,809,180 A | 2/1989 | Saitoh | |
| 4,809,804 A * | 3/1989 | Houston et al. | 180/65.5 |
| 4,812,838 A | 3/1989 | Tashiro | |
| 4,815,785 A | 3/1989 | Goodall | |
| 4,846,529 A | 7/1989 | Tulley | |
| 4,913,257 A * | 4/1990 | Janssen | 180/333 |
| 4,962,448 A * | 10/1990 | DeMaio et al. | 700/17 |
| 4,969,685 A | 11/1990 | Chihaya | |
| 5,127,621 A | 7/1992 | Uecker et al. | |
| 5,127,699 A | 7/1992 | Maezawa | |
| 5,161,765 A | 11/1992 | Wilson | |
| 5,341,894 A | 8/1994 | Van Gorder, Jr. | |
| 5,346,035 A | 9/1994 | Ueda et al. | |
| 5,409,079 A | 4/1995 | Strong | |
| 5,482,354 A | 1/1996 | Gryp | |
| 5,568,960 A | 10/1996 | Oleson | |
| 5,584,460 A | 12/1996 | Ropp | |
| 5,730,236 A | 3/1998 | Miller | |
| 5,788,015 A | 8/1998 | Seng | |
| 5,839,542 A | 11/1998 | Seng | |
| 5,845,735 A * | 12/1998 | Muller et al. | 180/322 |
| 5,860,488 A | 1/1999 | Kim | |
| 5,890,764 A | 4/1999 | Lee | |
| 5,895,093 A | 4/1999 | Casey | |
| 5,921,340 A | 7/1999 | Abels | |
| 5,941,498 A | 8/1999 | Hoshihara et al. | |
| 5,951,106 A | 9/1999 | Hirama et al. | |
| 5,992,935 A | 11/1999 | Duijnstee | |
| 6,009,357 A | 12/1999 | Wellman | |
| H001831 H * | 2/2000 | Kelley et al. | 180/333 |
| 6,027,170 A | 2/2000 | Benz | |
| 6,039,141 A * | 3/2000 | Denny | 180/329 |
| 6,064,932 A | 5/2000 | Francois | |
| 6,086,142 A | 7/2000 | Simmons | |
| 6,168,234 B1 | 1/2001 | Haynes et al. | |
| 6,186,573 B1 | 2/2001 | Thurab | |
| 6,189,964 B1 | 2/2001 | Henshaw . | |
| 6,196,630 B1 | 3/2001 | Cheng | |
| 6,267,071 B1 | 7/2001 | Ellis | |
| 6,283,504 B1 | 9/2001 | Stanley et al. | |
| 6,302,483 B1 | 10/2001 | Ricaud | |
| 6,361,111 B1 | 3/2002 | Bowers | |
| 6,446,758 B1 | 9/2002 | Schatz | |
| 6,533,076 B1 | 3/2003 | Haverfield | |
| 6,533,321 B2 | 3/2003 | Class et al. | |
| 6,536,825 B2 | 3/2003 | McAndrew | |
| 6,536,842 B2 | 3/2003 | Bowers | |
| 6,540,250 B1 | 4/2003 | Peterson | |
| 6,543,848 B1 | 4/2003 | Suga et al. | |
| 6,563,761 B1 | 5/2003 | Schaffran et al. | |
| 6,564,896 B1 | 5/2003 | Proksch | |
| 6,564,906 B1 | 5/2003 | Haack | |
| 6,572,172 B1 | 6/2003 | Ninomiya et al. | |
| 6,578,854 B2 | 6/2003 | Wucherfennig | |
| 6,678,601 B2 | 1/2004 | Whinnery | |
| 6,679,349 B1 | 1/2004 | Pollish | |
| 6,814,174 B2 | 11/2004 | Fluent et al. | |
| 2002/0125988 A1 | 9/2002 | Nagasaka | |
| 2002/0145315 A1 | 10/2002 | Fraley et al. | |
| 2002/0166267 A1* | 11/2002 | McGugan | 37/348 |
| 2003/0001404 A1 | 1/2003 | Michel | |
| 2003/0019684 A1 | 1/2003 | Wucherpfennig | |
| 2003/0057755 A1 | 3/2003 | Brandt | |
| 2003/0062753 A1 | 4/2003 | Chao | |
| 2003/0127272 A1 | 7/2003 | Baker | |
| 2003/0189370 A1 | 10/2003 | Hemmer | |
| 2003/0230447 A1 | 12/2003 | Wulfert | |
| 2003/0230920 A1 | 12/2003 | Itou | |
| 2004/0080204 A1 | 4/2004 | Enomoto et al. | |
| 2004/0173409 A1 | 9/2004 | Hock et al. | |
| 2004/0211616 A1 | 10/2004 | Ueda et al. | |
| 2004/0262961 A1 | 12/2004 | Young et al. | |
| 2005/0006939 A1 | 1/2005 | Hancock et al. | |
| 2005/0034915 A1* | 2/2005 | Kumazawa | 180/331 |
| 2005/0073184 A1 | 4/2005 | Tsuji et al. | |
| 2006/0042857 A1* | 3/2006 | Catton et al. | 180/334 |

FOREIGN PATENT DOCUMENTS

| | | |
|---|---|---|
| DE | 3317340 A1 | 11/1984 |
| DE | 36 25 057 A1 | 1/1988 |
| DE | 4203150 A1 | 8/1993 |
| DE | 4309894 A1 | 10/1993 |
| DE | 4415933 A1 | 11/1994 |
| DE | 19512284 A1 | 10/1996 |
| DE | 19730131 | 4/1999 |
| DE | 19650338 | 7/1999 |
| DE | 19742666 A1 | 8/1999 |
| DE | 10050580 A1 | 4/2001 |
| DE | 202 13 915 U1 | 2/2003 |
| EP | 0369951 B1 | 9/1992 |
| EP | 0317520 B1 | 6/1993 |
| EP | 0 670 239 A1 | 9/1995 |
| EP | 0600453 B1 | 5/1996 |
| EP | 0548450 B1 | 8/1996 |
| EP | 0847893 A2 | 6/1998 |
| EP | 0960850 A2 | 12/1999 |
| EP | 1002760 A1 | 5/2000 |

| | | |
|---|---|---|
| EP | 1070627 A2 | 1/2001 |
| EP | 0988249 B1 | 3/2001 |
| EP | 1186466 A1 | 3/2002 |
| EP | 1 260 477 A1 | 11/2002 |
| EP | 1264940 A1 | 12/2002 |
| EP | 0812722 B1 | 5/2003 |
| EP | 1367474 A2 | 12/2003 |
| EP | 1386777 A1 | 4/2004 |
| FR | 2544973 | 11/1984 |
| FR | 2678871 | 1/1993 |
| FR | 2690320 A1 | 10/1993 |
| FR | 2776583 | 1/1999 |
| FR | 2796014 | 1/2001 |
| FR | 2828846 | 2/2003 |
| FR | 2828847 | 2/2003 |
| GB | 1022623 | 3/1966 |
| GB | 2301620 B | 7/1997 |
| GB | 2301026 B | 2/1999 |
| GB | 2300119 B | 3/1999 |
| GB | 2308058 B | 6/1999 |
| GB | 2345633 B | 9/2000 |
| GB | 2 396 102 A | 6/2004 |
| JP | 58 101832 A | 6/1983 |
| JP | 58101832 | 6/1983 |
| JP | 3178839 | 8/1991 |
| JP | 4300738 | 10/1992 |
| JP | 04358931 A | 12/1992 |
| JP | 06001171 A | 1/1994 |
| WO | WO 96/10817 A1 | 4/1996 |
| WO | WO 01/64576 A1 | 9/2001 |
| WO | WO 01/68400 A1 | 9/2001 |
| WO | WO 02/40311 A1 | 5/2002 |

OTHER PUBLICATIONS

Crown specification brochure entitled 40TSP Turret Sideloader, 4000 lb capacity, Series TS, SF12182, Rev. Jul. 2000.
Raymond advertisement brochure No. SIPD-0046 30M CP entitled EASi Operator-Up Swing-Reach Truck for Maximum Productivity and Flexibility, Jun. 1995 USA.
Yale advertisement brochure No. 2447-1/01-30 entitled Yale Very Narrow Aisle, 2001 USA.
OM PIMESPO advertisement brochure entitled Turret Trucks (man up) Dual, 5 pgs.
Linde advertisement brochure entitled Electric Man-up Combination Truck (Order Picking/Turret) 1000 kg., 2 pgs.
Jungheinrich advertisement brochure entitled The new Jungheinrich High Rack and Order Picking Stacker ETX-KOMBI 125/150K/150 L, 2 pgs.
Hyster Company advertisement brochure V30-35/XMU Turret Trucks, Introducing: The Vanguard of High Density; Part No. V3U-35BTG Jan. 1999.
Dambach advertisement brochure entitled Order Picking Stackers The Hi-Racker, Sep. 2000, Germany, 8 pgs.
Narrow Aisle Limited advertisement brochure entitled Combi Double Deep, 1994, England, 2 pgs.
Jungheinrich advertisement brochure entitled 3 Phase AC, Germany.
News article featuring Translift's Bendi BE40.
Crown Operator Manual No. PF12495 Rev. Apr. 2001 entitled Crown T3 Series, USA.
Crown advertisement brochure No. SF4312 Rev. Jun. 1998 entitled Turret Sideloader, USA.
Linde advertisement brochure entitled Electric Man-up Combination Truck (Order Picking/Turret 1350 kg.
Translift photographs of Smart Bendi Task Positionable Swing Cabs.
Valtra photographs of Task Positionable Swing Seat.
Fiori SPA advertisement brochure for D40 dumper, Italy.
Valtra photographs for Ergocab and TwinTrac.
New Holland photographs of the TV 140 Turnabout console.
Magazine article from iVT International, Sep. 2002, showing Still's R60 counterbalance trucks, 1 pg.
Jungheinrich advertisement brochure entitled Jungheinrich High Rack Stacker Capacity 1250 kg ETXac 125, 1 pg.
Advertisement for ACROBA, 1 pg.
Photograph of a CAT seat, 1 pg.
Vermeer rotating seat Advertisement, 1 pg.
Crown specification brochure No. SF12183 entitled TSP Series turret stockpicker, Apr. 2002 USA.
Crown Operator Manual for TSP Series No. PF12496 Jul. 2001, USA.
Crown specification brochure for model 30TSP Turret Stockpicker, 3000 lb. capacity, 5 pgs.

* cited by examiner

SYSTEMS AND METHODS FOR SEAT REPOSITIONING

CROSS REFERENCE TO RELATED APPLICATIONS

The present application is related to U.S. Pat. No. 7,121,608, entitled "Rotating and/or Swiveling Seat", U.S. patent application Ser. No. 11/539,676, a divisional of U.S. Pat. No. 7,121,608, U.S. Pat. No. 7,059,680,entitled "Seat Repositioning Device With Release On Control Handle", and U.S. patent application Ser. No. 11/375,172, a continuation of U.S. Pat. No. 7,059,680,each of which are hereby incorporated by reference.

BACKGROUND OF THE INVENTION

The present invention relates in general to working vehicles, and more particularly to seat repositioning systems for such vehicles.

Working vehicles such as materials handling vehicles, construction vehicles and agricultural vehicles may include operator's seats that are repositionable. However, an operator in a seated position must typically reach down beneath a seat bottom to operate a handle or lever in order to reposition the operator's seat. The positioning of the release handle under the operator's seat is common for adjusting seats that may be rotated to one or more positions and for releasing/controlling seats capable of forward and backward positioning adjustments. In many applications, it can be very difficult if not impossible to operate other control elements while attempting to also operate a lever or handle underneath the seat to attain a given seat position.

SUMMARY OF THE INVENTION

The present invention provides a vehicle seat arrangement for a working vehicle comprising an operator's seat having at least one adjustable feature, such as the ability to rotate the seat, adjust the height or seat back tilt, adjust the positioning of the seat fore and aft, and/or adjust the positioning of the seat in a lateral (side to side) direction. The working vehicle further includes one or more control elements positioned within the vehicle where at least one of the control elements defines a seat adjusting element which corresponds to the at least one adjustable feature of the operator's seat. The positioning of the seat adjusting element allows the operator to establish a work operative position where the operator may operate at least one of the control elements and the seat adjusting element without requiring large limb movements or excessive awkward adjustments of position.

In a first illustrative implementation of the present invention, a first control element is arranged such that a first work operative position is defined with respect to an operator, the first control element and the operator's seat. For example, where the first control element is positioned in a control area, the first work operative position may be defined by an operator seated in the operator's seat with a hand suitably positioned within or about the control area. Similarly, where the first control element is provided on a control handle, the first work operative position may be defined by an operator seated in the operator's seat with a hand suitably positioned on the control handle. A seat adjusting element is further provided which corresponds to the at least one adjustable feature of the operator's seat. The seat adjusting element is positioned relative to the first control element such that the operator may selectively control the adjustable operator's seat without interrupting the first work operative position. Continuing with the above examples, the seat adjusting element may be positioned within the control area or on the control handle such that the seat adjusting element may be operated without significantly disturbing the operable engagement of the operator's hand with the first control element.

As another example, the seat adjusting element may be positioned away from the first control element, e.g., outside the control area or not on the control handle. In such an exemplary application of the present invention, the first work operative position comprises a position in which a first hand of the operator is in a working position with respect to the first control element and a second hand of the operator is in a working position with respect to the seat adjusting element.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
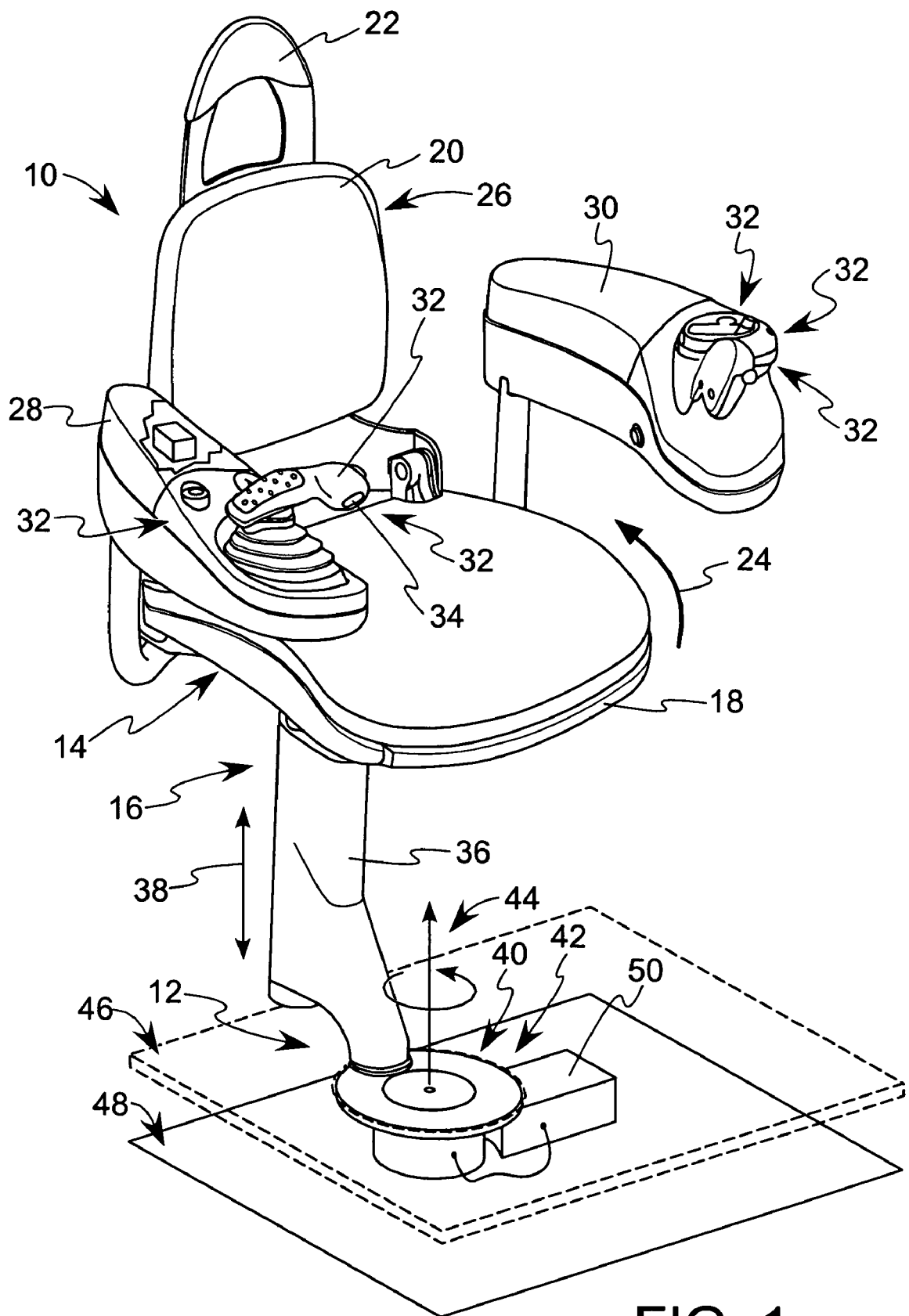
FIG. 1 is a perspective view of an operator's seat for an exemplary working vehicle according to the present invention.

Referring now to the drawings, and particularly to FIG. 1, an operator's seat 10 for a working vehicle includes generally, a base structure 12 coupled to an operator support 14 by an intermediate member 16. The operator support 14 comprises a seat bottom 18, a seat back 20, and a headrest 22. The seat bottom 18 may be hingedly supported so as to be repositionable from a substantially horizontal position or seat down position (as shown) to a substantially vertical position or seat up position (not shown) by pivoting the seat bottom 18 in the direction of arrow 24. The operator support 14 may also optionally include an adjustable feature such as a seat back tilt arrangement that allows the seat back 20 to tilt in the direction of arrow 26.

The operator's seat 10 further includes right and left armrests 28, 30 upon which control elements 32 may optionally be attached. For purposes of illustration, a plurality of control elements 32 are provided on each armrest 28, 30 as shown in FIG. 1. The control elements 32 collectively provide the functionality necessary to operate the vehicle and its features, including controlling navigation of the vehicle, operation of the working implements of the vehicle, and/or operation of other features related to the vehicle or to the performance of specific tasks associated with the vehicle. In particular, at least one of the control elements 32 comprises a seat adjusting element 34 that is associated with one or more of the adjustable features of the operator's seat 10 as will be explained in greater detail below.

The control elements 32 may include elements such as buttons, levers, switches, steering and other control wheels, joysticks, jog wheels, throttles, twist grips, finger operated levers and controls, potentiometers, encoders and other controls positioned individually, or combined in one or more control areas. Moreover, the control elements 32 may be positioned on or about one or both of the armrests 28, 30, or the control elements 32 may be otherwise positioned so as to be accessible to an operator, e.g., on or about a console or other structure of the vehicle.

For example, where the operator's seat 10 is utilized in a materials handling vehicle, a select one of the control elements 32 may comprise a traction control arm for controlling direction of movement as well as acceleration and deceleration of the corresponding vehicle, and a steering tiller, e.g., a finger operated tiller disk having a pop-out handle, for steering the vehicle. The traction control arm and the steering tiller may thus be operated in combination with brake pedals (not shown) to drive the vehicle. Further select ones of the control elements 32 may be used for controlling traverse and rotation of forks on the vehicle, and/or for raising and lowering primary and/or auxiliary masts. Moreover, control elements 32 may be provided to operate other working implements, command features or control features, such as to sound a horn or other audible or visual signal, to operate a fan, communications link, light, scanner technology, or provide any other desired function necessary to perform a given task.

The intermediate member 16 includes generally, a first frame member 36 that extends substantially vertically between the base structure 12 and the operator support 14. The intermediate member 16 provides another adjustable feature that allows the height of the operator support 14 and armrests 28, 30 to be altered as indicated by directional arrow 38, e.g., using a gas cylinder (not shown). The ability to adjust the height of the operator support 14, including the seat bottom 18 and armrests 28, 30, allow the operator's seat 10 to accommodate the varying physical characteristics of anticipated vehicle operators. Moreover, the height of the seat bottom 18 may be adjusted to a first position when the seat bottom 18 is in the seat down position to provide a suitable support surface upon which the vehicle operator may sit, and the height of the operator support 14 may be raised when the seat bottom 18 is in the seat up position to provide a suitable support surface upon which the vehicle operator may lean when the vehicle operator is operating the vehicle in a standing position. The adjustability of the intermediate member 16 further allows the operator to reposition the control elements 32 on the right and left armrests 28, 30, to an appropriate working position when operating the vehicle in standing or sitting positions.

The base structure 12 comprises a mounting member 40 that couples between the first frame member 36 and a seat release system 42 for implementing yet another adjustable feature of the operator's seat 10, wherein the operator's seat 10 may be selectively rotated (at least partially) about a substantially vertical axis 44. The seat release system 42 may be located underneath a platform floor 46 of the vehicle and may be bolted or otherwise secured to a platform base 48 or other suitable structure such that the mounting member 40 is generally coplanar relative to the platform floor 46. A locking arrangement 50 such as a brake, solenoid or other suitable structure locks the operator's seat 10 into a position designated by the operator.

The seat release system 42 is operated using the seat adjusting element 34 to selectively release the locking arrangement 50 from a locking relationship with the operator's seat 10 for rotational adjustment of the operator's seat 10 about the axis 44. In this regard, the operator's seat 10 may include one or more designated locking positions such that when the operator's seat 10 is transitioned to a select one of the designated locking positions and the locking arrangement 50 is returned to its locking state, the operator's seat 10 is locked into that designated position. If the locking arrangement 50 is returned to its locking state before the operator's seat 10 is oriented with respect to one of the designated locking positions, the operator's seat 10 may lock into the next encountered locking position. As an alternative to designated locking positions, the operator's seat 10 may be lockable in any continuously variable position within the range of rotation of the operator's seat 10, which may include 360 degrees of rotation, or some amount less than 360 degrees of rotation.

Exemplary implementations of a suitable seat release system 42 and other features of the operator's seat 10 are set out in U.S. Pat. No. 7,059,680, entitled "Seat Repositioning Device with Release on Control Handle" and U.S. Pat. No. 7,121,608, entitled "Rotating and/or Swiveling Seat", both of which are incorporated by reference herein.

Figure 2:
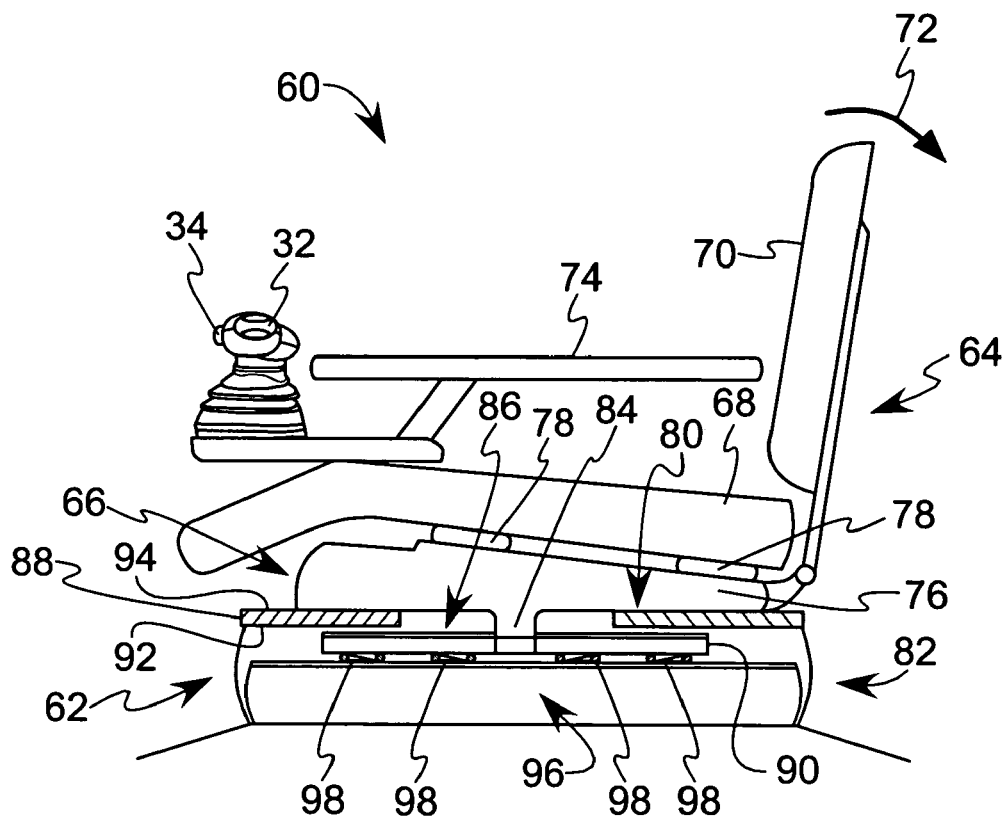
FIG. 2 is a side view of an alternative operator's seat for an exemplary working vehicle according to the present invention.

Referring to FIG. 2, another exemplary operator's seat 60 provides a mechanism by which the operator's seat 60 may be locked into an operator set position, or may be unlocked for rotational as well as horizontal (fore/aft and lateral) movement. The operator's seat 60 includes generally, a base structure 62 coupled to an operator support 64 by an intermediate member 66. The operator support 64 comprises a seat bottom 68 and a seat back 70. The operator support 64 may also optionally include an adjustable feature such as a seat back tilt arrangement that allows the seat back 70 to tilt in the direction of arrow 72. The operator's seat 60 in the illustrated embodiment further includes a single armrest 74. Control elements 32, including a seat adjusting element 34, are mounted to the armrest 74 as described in greater detail with reference to FIG. 1.

The intermediate member 66 includes generally, a seat support member 76 that is positioned below, and spaced from the seat bottom 68 by one or more shock absorbing devices 78. Moreover, a seat release system 82 is provided to lock the intermediate member 66 and the operator support 64 to the base structure 62. The seat release system 82 comprises a locking arrangement that includes a brake support 84 that extends generally downward from the seat support member 76 and passes through an aperture 86 in a top support plate 88 of the base structure 62. A brake plate 90 is attached generally about the terminal end of the brake support 84. When the locking arrangement is in an unlocked position as shown in FIG. 2 on an exaggerated scale, the brake plate 90 is relieved from frictional relationship with an inside surface 92 of the top support plate 88. When the locking arrangement is in a locked position (not shown), the brake plate 90 is urged against an inside surface 92 of the top support plate 88. To this end, the brake plate 90, the inside surface 92 of the top support plate 88 or both may contain friction bearing materials so as to secure the operator's seat 60 into the operator set position when locked. The seat support member 76 thus rests on top support plate 88. The interface 94 between the seat support member 76 and the top support plate 88 comprises a reduced friction interface, e.g., by using Teflon, bearings, lubricants or other friction reducing materials and/or structures, that allows the operator's seat to be freely repositioned within a predetermined area defined generally by the aperture 86 when the locking arrangement is in the unlocked state.

A release device 96 is provided to transition the locking arrangement to the unlocked state under the control of the seat adjusting element 34. When the seat adjusting element 34 is actuated, the release device 96 draws the brake plate 90 away from the top support plate 88. In this regard, the release device 96 may be any suitable device such as an electromagnet, solenoid or other electromechanical, mechanical, electrical or other device, capable of causing at least a partial release in the frictional relationship between the brake plate 90 and the inside surface 92 of the top support plate 88. When the seat adjusting element 34 is released, the release device 96 is deactivated, e.g., by de-energizing the electromagnet or other device, and one or more biasing devices 98, such as springs, urge the brake plate 90 into locking relationship with the inside surface 92 of the top support plate 88. The seat release system 82 is not limited to that illustrated, however. Another exemplary implementation of a seat release system that allows adjustments of a seat in a limited area is set out in U.S. Pat. No. 4,671,572, entitled "Adjustable Chair Having Roller Cam Adjustment Mechanism", which is incorporated by reference herein.

Figure 3:
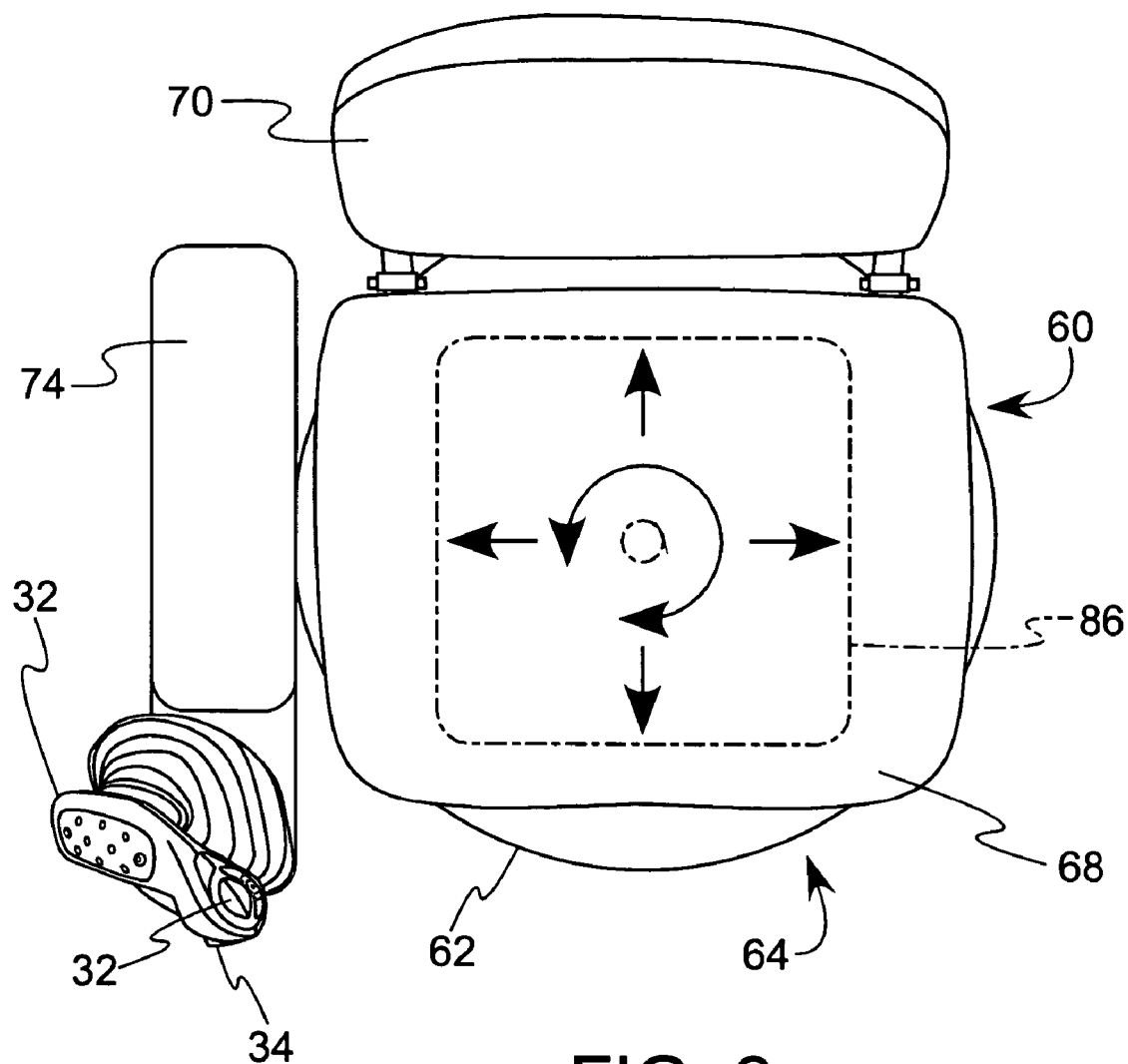
FIG. 3 is a top view of the operator's seat of FIG. 2.

Referring to FIG. 3, when the seat release system 82 is in an unlocked state, such as by maintained actuation of the seat adjusting element 34, the operator's seat 60 may be repositioned anywhere in a bounded area defined generally by the dimensions of the aperture 86 in the base structure 62. The operator may set the operator's seat 60 into an infinitely variable number of positions, including adjustments of fore and aft, lateral (side to side) and rotational positions. When the seat release system 82 is placed in a locking state, such as by releasing the seat adjusting element 34, the operator support 64 is locked into its new, operator set position.

Figure 4:
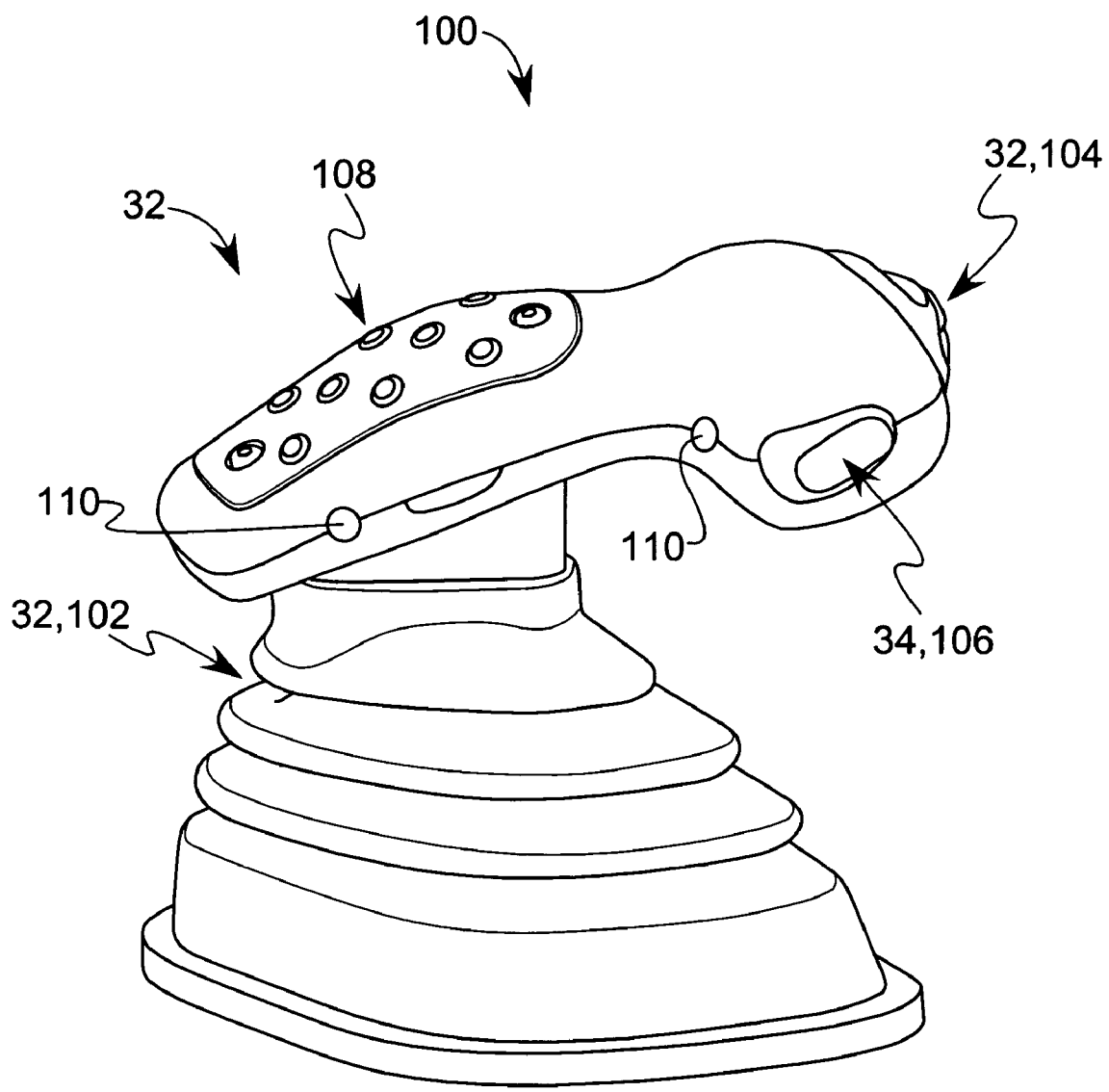
FIG. 4 is a perspective view of a control element on a seat handle of the operator's seat shown in FIGS. 1 and 2.

With reference now to FIG. 4, one or more of the control elements 32 and the seat adjusting element 34 of FIGS. 1-3 may be combined into a control area that includes a multi-function control handle 100 as shown. The exemplary control handle 100 includes a control element 32 implemented as a joystick 102, a control element 32 implemented as a thumb-operated control 104 and the seat adjusting element 34 implemented as a button or finger operated control element 106. However, any combination of control elements may be combined as set out in the discussion with reference to FIG. 1.

As generally considered herein, a work operative position designates a position where the operator may operate at least one of the control elements 32 and the seat adjusting element 34 without requiring large limb movements or excessive awkward adjustments of position. As an example, the work operative position may comprise a position in which an operator is set to operate the control handle 100 shown in detail in FIG. 4. In such an exemplary work operative position, the palm of the operator's hand will typically be resting upon a textured portion 108 of the joystick 102 so as to be sensed by integrated hand sensors 110. The integrated hand sensors 110, such as optical sensing elements, are optional, but may be used for example, to inform the corresponding vehicle electronics, that the operator is positioned in the work operative position. Moreover, hand sensors may be implemented into other arrangements of control elements 32 which are positioned individually, or in other arrangements of control areas.

With the operator's palm resting on the textured portion 108, the joystick 102 may be readily operated. Moreover, in this position, the operator's right thumb is oriented so as to selectively operate the thumb-operated control 104. The operator can also reach (and actuate) the seat adjusting element 34 using only a slight finger movement, by lifting and repositioning the index finger to the seat adjusting element 34. The seat adjusting feature of the operator's seat 10, 60 is thus operated without removing the operator's palm from the textured portion 108 of the joystick 102 and/or removing the thumb from the area of the thumb-operated control 104. Generally, a designated work operative position does not require that the operator be actively operating a control element 32. Moreover, the designated work operative position does not require the operation of a select one of the control elements 32 and the seat adjusting element 34 at the same time. Rather, the work operative position designates a position where the operator may operate at least one of the control elements 32 and the seat adjusting element 34 without requiring large limb movements or excessive awkward adjustments of position.

Again, the seat adjusting element 34 can adjust any one or more of the adjustable features of the operator's seat 10, 60. The particular adjustable feature of the operator's seat that is assigned to the seat adjusting element 34 will likely depend upon the working vehicle and other factors set out more fully herein. Thus, every operation that can be performed with the handle 100, including adjustment of the operator's seat 10, 60, can be accomplished without removing the hand from the first work operative position. As such, seat dynamics can be blended with task control not related to adjustment of the operator's seat 10, 60.

With reference to FIGS. 1-4, because the seat adjusting element 34 and at least one other control 32 may be operated without requiring the operator to leave the designated work operative position, a vehicle operator may adjust or reposition the operator's seat 10, 60 without interrupting the performance of a given task or tasks, or without interrupting the transition from a first task to a second task. This allows seat adjustments to be performed concomitantly with the performance of tasks not related to seat repositioning when desired. Moreover, as best seen in FIGS. 1 and 2, the seat adjusting element 34 is optionally positioned above a horizontal plane of the control area, e.g., the associated armrest 28, 74, which may assist the vehicle operator in locating and/or activating the seat adjusting element 34 without significantly altering the line of sight of the vehicle operator or without significantly modifying the posture of the vehicle operator so as to require leaving the designated work operative position. Further, where the seat adjusting element 34 is positioned in a location other than an armrest of the operator's seat 10, 60, e.g., in a control area of a console or other location within the vehicle, the seat adjusting element 34 may be positioned above a horizontal plane designating that control area.

Sometimes, the seat adjusting element 34 may not be positioned proximate to the control element 32 assigned to perform a certain task. For example, in FIG. 1, control elements 32 are positioned on both the right and left armrests 28, 30, and it may be impractical or undesirable to incorporate a seat adjusting element 34 on both armrests 28, 30. As an example, assume that the seat adjustment element 34 comprises a button on a control handle 100 that is provided on the right armrest 28 of the operator's seat 10 as shown in FIG. 1. Further, assume that a vehicle operator desires to operate a control element 32, such as a lever for controlling traversing and rotation of the forks of a materials handling vehicle, which is positioned on the left armrest 30.

Using the exemplary materials handling vehicle described above, an illustrative first work operative position may include the operator's right hand positioned to operate the seat adjusting element 34, such as described above with reference to FIG. 4, and may include the operator's left hand in a working position with respect to the fork operating lever on the left armrest 30. The first work operative position thus allows the operator to operate the lever for controlling traversing and rotation of the forks of the materials handling vehicle with the operator's left hand, then transition the left hand to another control element 32 within the vehicle, e.g., to a second work operative position. However, in this example, the seat adjusting element 34 remains in a working position with respect to the operator's right hand, even during transition from the first work operative position to the second work operative position.

By incorporating the seat adjusting element 34 with other control elements 32, such as in a control area, on a joystick, multifunction control handle 100 or other control handle where the operator is positioned for performing a task, i.e., in a working position, or by placing a free hand, arm, leg, foot, etc. in a working position with respect to the seat adjusting element 34, the location of the seat adjusting element 34 and its control can become second nature. Accordingly, an operator can maintain visual focus on a first task while simultaneously adjusting the operator's seat 10, 60 and/or the vehicle operator may be able to transition from a first task to a second task without interruption of the required work operative position(s) to modify the positioning of the operator's seat 10, 60.

The seat adjusting element 34 can be made to allow adjustment of any one or more of the repositionable feature(s) of the corresponding operator's seat 10, 60. That is, the exemplary operator's seats 10, 60 illustrate adjustments including seat rotation, seat back tilt, seat height raise and lower, and seat adjustments within a range of positions including fore, aft and lateral directions. However, other seat adjustments may also be implemented and controlled by the seat adjusting element 34. To this end, the seat adjustment capabilities will likely depend upon the requirements of the corresponding working vehicle.

In one illustrative embodiment of the present invention, the multifunction control handle 100 shown in FIG. 4 is implemented on the right armrest 28 of an operator's seat 10 as shown in FIG. 1. Actuation of the seat adjusting element 34, such as by depressing the button 106 on the control handle 100, triggers the release of the operator's seat 10 for adjustment by communicating through a vehicle network, such as a Controller Area Network (CAN) or any other practical bus system or communications link. Where the seat adjustment commands are integrated into a network, vehicle-wide decisions can be made that affect the performance of the seat adjusting element 34 and/or other control elements 32 provided for the vehicle. For example, the state or detected position of the operator's seat may affect operability of working implements provided on the vehicle, and may alternatively be used to enable, limit, disable, or otherwise affect the state of the other tasks performed by the control elements 32. Correspondingly, a state or condition of the vehicle, working implement or task may affect the ability of the operator to reposition the operator's seat 10.

For example, even though the operator may control the seat adjusting element 34 simultaneously with other control elements 32, e.g., vehicle speed controls, the vehicle system electronics (not shown) may prohibit the seat release system 42 from unlocking the operator's seat 10 if the detected vehicle speed exceeds a predetermined threshold speed. Examples of the above described communication and control aspects are set out in greater detail in 95 U.S. Pat. No. 7,059, 680, entitled "Seat Repositioning Device with Release on Control Handle", and U.S. Pat. No. 7,121,608, entitled "Rotating and/or Swiveling Seat", both of which are incorporated by reference herein.

Figure 5:
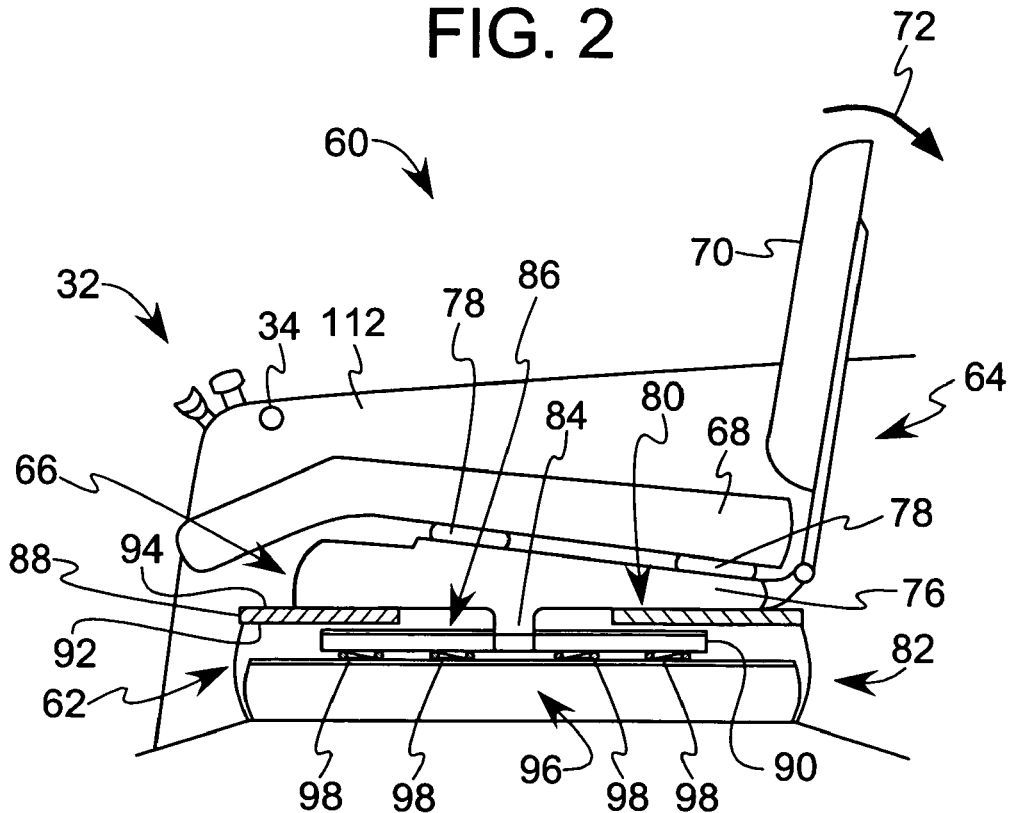
FIG. 5 is a side view of the operator's seat of FIG. 2, wherein the control elements are moved from an armrest to a location proximate the operator's seat, but still within a work operative position.

The above examples were presented by way of illustration and not by way of limitation to demonstrate the broad flexibility of the present invention and to demonstrate exemplary approaches to integrate seat release commands into the workflow and control decisions of other vehicle processes. As such, the exact implementation of the seat release assembly will likely be dependent upon the capabilities and features of the particular working vehicle and the tasks to be performed. Thus, the release assembly may comprise mechanical, electrical, electromechanical, pneumatic, hydraulic and other powered sources. Still further, FIG. 5 illustrates an operator's seat 60 similar to that illustrated in FIG. 2 except that there is no armrest 74 as shown in FIG. 2. Rather, the control elements 32, including the seat adjusting element 34 are positioned within a control area of a panel 112 of the vehicle. The panel 112 is positioned proximate to the operator's seat 60 such that an operator seated in the operator's seat 60 will be able to position a hand in the vicinity of the control area, e.g., with the corresponding arm resting on the upper surface of the panel 112, and operate the control elements 32, 34, which may comprise elements such as finger operated levers, buttons or other controls as set out more fully herein. Under this arrangement, the adjustable feature of the operator's seat 60 may be limited to fore/aft adjustments. However, the control elements 32 including the seat adjusting element 34 may be positioned in any reasonable position such that an operator, either sitting in the operator's seat or standing proximate to the operator's seat can be positioned in a work operative position as set out in greater detail herein.

Having described the invention in detail and by reference to preferred embodiments thereof, it will be apparent that modifications and variations are possible without departing from the scope of the invention defined in the appended claims.

What is claimed is:

1. A vehicle seat arrangement in a materials handling vehicle comprising:

an operator's seat in said materials handling vehicle having an adjustable feature;

a locking arrangement that is normally in a locked state to lock said adjustable feature of said operator's seat into a designated position;

a first control area comprising a control handle that is positioned proximate to said operator's seat that supports at least one function for operating said materials handling vehicle, wherein a first work operative position is defined with respect to said control handle and said operator's seat;

a first control element for implementing said at least one function for operating said materials handling vehicle arranged within said first control area on said control handle; and a seat adjusting element positioned control area on said control handle that is operatively coupled to said locking arrangement such that operation of said seat adjusting element causes said locking arrangement to transition to an unlocked state to release said adjustable feature of said operator's seat for operator repositioning and subsequent release of said seat adjusting element enables said locking arrangement to transition back to a locked state, wherein:

said adjustable feature of said operator's seat is selectively controlled by operation of said seat adjusting element without releasing said control handle, thus maintaining said first work operative position.

2. The vehicle seat arrangement according to claim 1, wherein said first control element and said seat adjusting element are simultaneously controllable to adjust said adjustable feature of said operator's seat while performing a task in said first work operative position.

3. The vehicle seat arrangement according to claim 1, wherein said area control handle comprises a joystick.

4. The vehicle arrangement according to claim 1, wherein said control handle comprises at least one finger operated control element.

5. The vehicle seat arrangement according to claim 1, wherein said first control element and said seat adjusting element are positioned proximate to each other and are supported by an armrest of said operator's seat such that each of said first control element and said seat adjusting element can be operated without interrupting said first work operative position.

6. The vehicle seat arrangement according to claim 1, wherein said first control area further comprises a sensor to detect the presence of a hand of an operator.

7. The vehicle seat arrangement according to claim 1, wherein said first control element and said seat adjusting element are configured so as to allow performance of a first task involving operation of said first control element concomitantly with control of said adjustable feature of said operator's seat without interrupting said first work operative position.

8. The vehicle seat arrangement according to claim 1, wherein said vehicle further comprises a second control element arranged such that a second work operative position is defined with respect to said second control element, said seat adjusting element and said operator's seat, wherein an operator can transition from a first task involving said first control element to a second task involving operation of said second control element without interrupting said first or second work operative positions, wherein said adjustable feature of said operator's seat is selectively controlled by operation of said seat adjusting element before, during or after said operator transitions to said second work operative position.

9. The vehicle seat arrangement according to claim 1, wherein operation of said seat adjusting element releases said adjustable feature of said operator's seat for adjustment in at least one of fore, aft, lateral or rotational repositioning.

10. The vehicle seat arrangement according to claim 1, wherein: said adjustable feature of said operator's seat is normally locked into a select one of at least two designated positions; and
  said seat adjusting element selectively releases said adjustable feature for repositioning, wherein said adjustable feature of said operator's seat is locked into a next one of said at least two designated positions upon release of said seat adjusting element.

11. The vehicle seat arrangement according to claim 10, wherein said adjustable feature is infinitely adjustable within a range of positions.

12. The vehicle seat arrangement according to claim 1, wherein:
  said operator's seat comprises an armrest;
  said first control area is located on said armrest; and
  said seat adjusting element is positioned above a horizontal plane of said armrest.

13. The vehicle seat arrangement according to claim 1, wherein said seat adjusting element is positioned above a horizontal plane of said first control area.

14. A method of increasing productivity in a materials handling vehicle comprising:
  providing an operator's seat in said materials handling vehicle having an adjustable feature;
  providing a locking arrangement that is normally in a locked state to lock said adjustable feature of said operator's seat into a designated position;
  providing a first control element on a control handle of said operator's seat;
  defining a first work operative position with respect to control handle and said operator's seat; and
  providing a seat adjusting element on said control handle that is operatively coupled to said locking arrangement such that operation of said seat adjusting element causes said locking arrangement to transition to an unlocked state to release said adjustable feature of said operator's seat for operator repositioning and subsequent release of said seat adjusting element enables said locking arrangement to transition back to a locked state, said seat adjusting element positioned such that said adjustable feature of said operator's seat is selectively controllable without interrupting said first work operative position.

15. A vehicle seat arrangement in a materials handling vehicle comprising:
  an operator's seat in said materials handling vehicle having an adjustable feature;
  a locking arrangement that is normally in a locked state to lock said adjustable feature of said operator's seat into a designated position;
  a first control element arranged on a control handle of said operator's seat; and
  a seat adjusting element positioned on said control handle that is operatively coupled to said locking arrangement such that operation of said seat adjusting element causes said locking arrangement to transition to an unlocked state to release said adjustable feature of said operator's seat for operator repositioning and subsequent release of said seat adjusting element enables said locking arrangement to transition back to a locked state, wherein:
  said first control element is spaced from said seat adjusting element such that a first work operative position is defined with respect to said first control element and said seat adjusting element such that said adjustable feature of said operator's seat is selectively controllable by operation of said seat adjusting element without interrupting said first work operative position.

16. The vehicle seat arrangement according to claim 15, wherein said first control element and said seat adjusting element are simultaneously controllable to adjust said adjustable feature of said operator's seat while performing a task in said first work operative position.

17. The vehicle seat arrangement according to claim 15, wherein said first control element control handle is positioned on a first armrest of said operator's seat.

18. The vehicle seat arrangement according to claim 15, wherein said control handle comprises a joystick, 19. The vehicle seat arrangement according to claim 15, further comprising a sensor to detect the presence of a hand of an operator on said control handle. comprising one indication of said first work operative position.

20. The vehicle seat arrangement according to claim 15, wherein said first control element and said seat adjusting element are configured so as to allow performance of a first task involving operation of said first control element concomitantly with control of said adjustable feature of said operator's seat without interrupting said first work operative position.

21. The vehicle seat arrangement according to claim 15, wherein said vehicle comprises a second control element arranged such that a second work operative position is defined with respect to said second control element, said seat adjusting element and said operator's seat, wherein an operator can transition from a first task involving said first control element to a second task involving operation of said second control element without interrupting said first or second work operative positions, wherein said adjustable feature of said operator's seat is selectively controlled by said operator before, during or after transitioning from said first work operative position to said second work operative position.

22. The vehicle seat arrangement according to claim 15, wherein operation of said seat adjusting element releases said adjustable feature of said operator's seat for adjustment in at least one of fore, aft, lateral or rotational repositioning.

23. The vehicle seat arrangement according to claim 15, wherein:
said adjustable feature of said operator's seat is normally locked into a select one of at least two designated positions; and said seat adjusting element for selectively releases said adjustable feature for repositioning, wherein said adjustable feature of said operator's seat is locked into a next one of said at least two designated positions upon release of said seat adjusting element.

24. The vehicle seat arrangement according to claim 23, wherein said adjustable feature is infinitely adjustable within a range of positions.

25. The vehicle seat arrangement according to claim 15, wherein:
said operator's seat comprises an armrest; and
said seat adjusting element is positioned above a horizontal plane of said armrest.

26. The vehicle seat arrangement according to claim 15, wherein said seat adjusting element is positioned above a horizontal plane of a surface upon which said seat adjusting element is positioned.

27. A vehicle seat arrangement in a materials handling vehicle comprising:
an operator's seat in said materials handling vehicle having an adjustable feature;
a locking arrangement that is normally in a locked state to lock said adjustable feature of said operator's seat into a designated position;
a first control element arranged on a control handle positioned on a first armrest of said operator's seat, wherein a first work operative position is defined with respect to said first control clement when said operator is operating said first control element control handle and said operator's seat;
a second control element, wherein a second work operative position is defined with respect to said second control element and said operator's seat; and
a seat adjusting element positioned on said control handle, said seat adjusting element operatively coupled to said locking arrangement such that said seat adjusting element causes said locking arrangement to transition to an unlocked state to release said adjustable feature of said operator's seat for operator repositioning and subsequent release of said seat adjusting element enables said locking arrangement to transition back to a locked state, said seat adjusting element positioned such that said adjustable feature of said operator's seat is selectively controlled by operation of said seat adjusting element without releasing said control handle, thus maintaining said first work operative position;
wherein said first control element, said second control element and said seat adjusting element are arranged such that said adjustable feature of said operator's seat is selectively controlled by operation of said seat adjusting element while maintaining said second work operative position.

28. The vehicle seat arrangement according to claim 27, wherein said second control element is arranged on a second armrest of said operator's seat.

* * * * *

UNITED STATES PATENT AND TRADEMARK OFFICE
CERTIFICATE OF CORRECTION

PATENT NO. : 7,520,567 B2 Page 1 of 1
APPLICATION NO. : 10/948722
DATED : April 21, 2009
INVENTOR(S) : Steven C. Billger et al.

It is certified that error appears in the above-identified patent and that said Letters Patent is hereby corrected as shown below:

Col. 8, line 50, "arranged within said first control area on said control" should read -- arranged on said control --;

Col. 8, line 52, "element positioned control area on said" should read -- element positioned on said --;

Col. 9, line 4, "wherein said area control handle" should read -- wherein said control handle --;

Col. 10, lines 6-7, "with respect to control" should read -- with respect to said control --;

Col. 10, line 49, "wherein first control element control handle" should read -- wherein said control handle --;

Col. 10, lines 55-56, "control handle. comprising one indication of said first work operative position." should read -- said control handle. --;

Col. 11, lines 7-8, "transitioning from said first work operative position to said second" should read -- transitioning to said second --;

Col. 11, lines 17-18, "adjusting element for selectively releases" should read -- adjusting element selectively releases --;

Col. 12, lines 7-8, "said first control element when said operator is operating said first control element control handle" should read -- said control handle. --.

Signed and Sealed this

First Day of September, 2009

David J. Kappos
*Director of the United States Patent and Trademark Office*